United States Patent [19]

Kuribayashi

[11] Patent Number: 5,650,988
[45] Date of Patent: Jul. 22, 1997

[54] DIGITAL SIGNAL REPRODUCING APPARATUS WITH AN AMPLITUDE LIMIT SAMPLING MEANS

[75] Inventor: Hiroki Kuribayashi, Tsurugashima, Japan

[73] Assignee: Pioneer Electronic Corporation, Tokyo, Japan

[21] Appl. No.: 600,659

[22] Filed: Feb. 13, 1996

[30] Foreign Application Priority Data

Feb. 13, 1995 [JP] Japan ................. 7-023957

[51] Int. Cl.⁶ ................. G11B 5/09; G11B 7/00
[52] U.S. Cl. ................. 369/59; 369/47; 369/50; 369/124; 360/32
[58] Field of Search ................. 369/47, 48, 49, 369/54, 58, 59, 60, 124; 360/32, 51, 46

[56] References Cited

U.S. PATENT DOCUMENTS

5,517,476  5/1996  Hayashi ................. 369/47 X

*Primary Examiner*—P. W. Huber
*Attorney, Agent, or Firm*—Fish & Richardson, P.C.

[57] ABSTRACT

It is an object to provide a digital signal reproducing apparatus which can correctly reproduce a digital signal by suppressing a deterioration in decoding performance of a Viterbi decoding even when an asymmetry occurs in an information digital signal read from an optical disc. An amplitude-limited sample value is obtained by limiting an amplitude of a sample value obtained by sampling the read signal up to a predetermined amplitude limit value. The amplitude limit sample values are Viterbi decoded on the basis of a plurality of prediction samples including prediction sample whose values are respectively equal to the predetermined upper and lower amplitude limit values.

5 Claims, 9 Drawing Sheets

DIGITAL SIGNAL REPRODUCING APPARATUS WITH AN AMPLITUDE LIMIT SAMPLING MEANS

BACKGROUND OF THE INVENTION

1. Field of the Invention

The present invention relates to a reproducing apparatus of a digital signal recorded on a recording medium such as an optical disk or the like.

2. Description of the Related Background Art

A Viterbi decoding method (Viterbi Algorithm) has been known as a method of decoding a digital signal with a high reliability from a read signal read out from a recording medium on which the digital signal has been recorded at a high density. In the Viterbi algorithm, a train of sample values which are obtained by sampling the read signal is regarded as a time sequence and a digital signal sequence of "1" and/or "0" which seems to be most certain is obtained on the basis of the time sequence.

Figure 1:
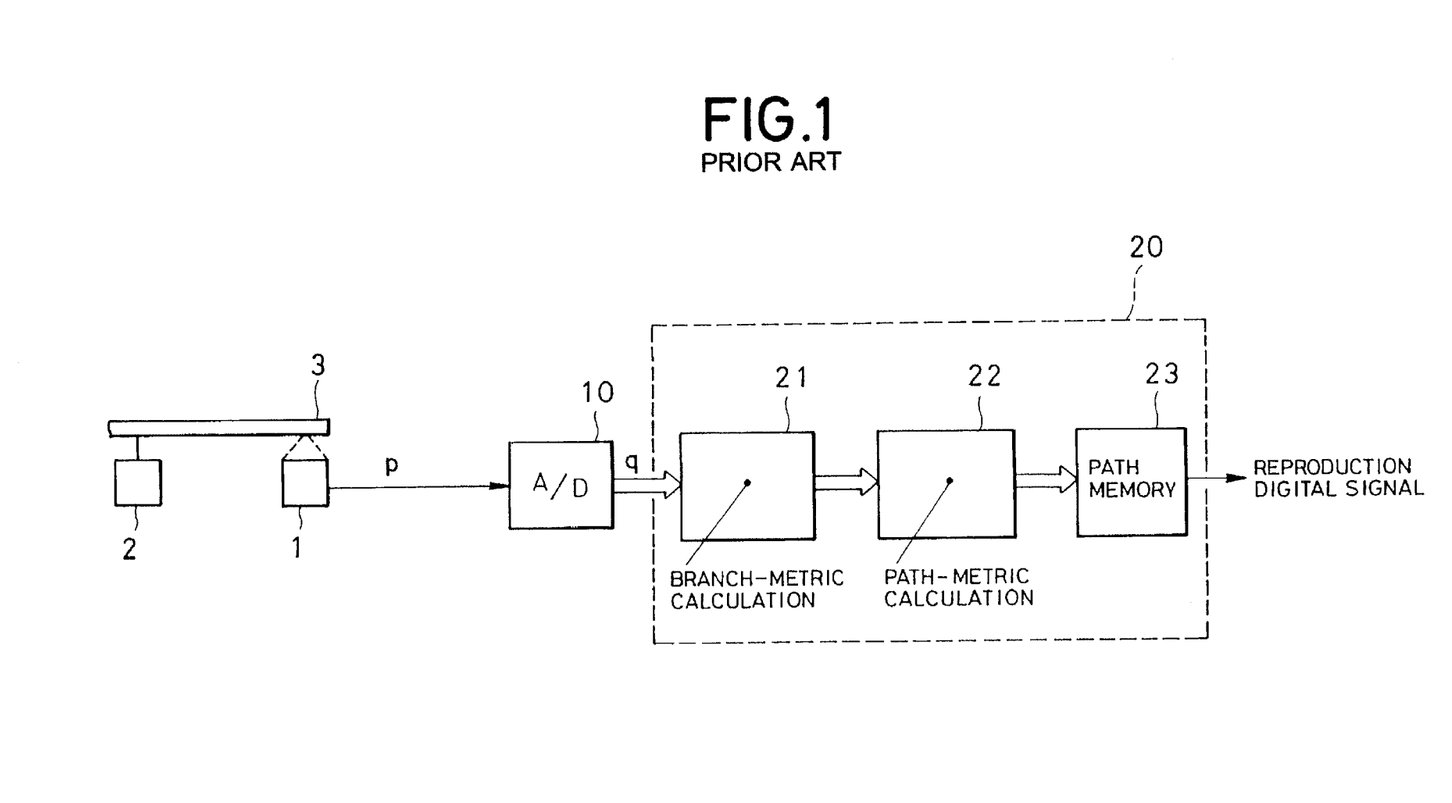
FIG. 1 is a diagram showing a construction of a conventional digital signal reproducing apparatus.

FIG. 1 is a diagram showing a construction of a reproducing apparatus for reproducing a digital signal from an optical disk as an optical recording medium by applying the Viterbi algorithm.

In FIG. 1, an optical pickup 1 irradiates a light beam onto an optical disk 3 which is rotated by a spindle motor 2. A digital recording signal consisting of binary values each of which is "0" or "1" has been recorded on the optical disk 3. The optical pickup 1 photoelectrically converts a reflection light from the optical disk 3 and obtains a read signal p and supplies the signal to an A/D converter 10. The A/D converter 10 samples the read signal p at a predetermined sampling timing and obtains a sample value q and supplies it to a Viterbi decoder 20.

Explanation will now be made with respect to the sample value q which is obtained in the case where a reproducing system shown in FIG. 1 is a partial response system of PR (1, 2, 2, 1) and a recording signal recorded on the optical disk 3 is a signal that was modulated under the rule of RLL(1, 7).

In the reproducing system of PR (1, 2, 2, 1), a value to be obtained as a sample value q is decided every signal train of continuous four bits of the recording signal recorded on the optical disk 3. Since the recording signal has been modulated under the rule of RLL(1, 7), its minimum inversion interval is equal to 2.

When the recording signal recorded on the optical disk 3 is considered on a unit basis of the 4-bit signal train, therefore, there are only ten kinds of patterns of the 4-bit train as follows.

[0, 0, 0, 0]
[0, 0, 0, 1]
[0, 0, 1, 1]
[0, 1, 1, 1]
[1, 1, 1, 1]
[1, 1, 1, 0]
[1, 1, 0, 0]
[1, 0, 0, 0]
[0, 1, 1, 0]
[1, 0, 0, 1]

When the PR (1, 2, 2, 1) transmitting system is considered by making bit "1" and bit "0" in the 4-bit signal train to correspond to +1 and −1, respectively, values of the sample values q which are obtained each time the 4-bit signal train is read out from the optical disk 3 become as follows.

$q[0,0,0,0]=(-1)\times1+(-1)\times2+(-1)\times2+(-1)\times1=-6$ $q[0,0,0,1]=(-1)\times1+(-1)\times2+(-1)\times2+(+1)\times1=-4$ $q[0,0,1,1]=(-1)\times1+(-1)\times2+(+1)\times2+(+1)\times1=0$ $q[0,1,1,1]=(-1)\times1+(+1)\times2+(+1)\times2+(+1)\times1=4$ $q[1,1,1,1]=(+1)\times1+(+1)\times2+(+1)\times2+(+1)\times1=6$ $q[1,1,1,0]=(+1)\times1+(+1)\times2+(+1)\times2+(-1)\times1=4$ $q[1,1,0,0]=(+1)\times1+(+1)\times2+(-1)\times2+(-1)\times1=0$ $q[1,0,0,0]=(+1)\times1+(-1)\times2+(-1)\times2+(-1)\times1=-4$ $q[0,1,1,0]=(-1)\times1+(+1)\times2+(+1)\times2+(-1)\times1=2$ $q[1,0,0,0]=(+1)\times1+(-1)\times2+(-1)\times2+(+1)\times1=-2$ Namely, in the case where the reproducing system shown in FIG. 1 is the PR (1, 2, 2, 1) transmitting system and the recording signal recorded on the optical disk 3 has been modulated under the format of RLL(1, 7), a value to be predicted as a sample value q is set to any one of 6, 4, 2, 0, −2, −4, and −6.

A branch-metric calculation circuit 21 in the Viterbi decoder 20 obtains a square error, that is, {[sample value q]−[prediction sample K]}$^2$ between each of a plurality of prediction samples which can be predicted as a sample value q, namely, prediction sample $K_0=6$
prediction sample $K_1=4$
prediction sample $K_2=2$
prediction sample $K_3=0$
prediction sample $K_4=-2$
prediction sample $K_5=-4$
prediction sample $K_6=-6$ and the actual sample value q, respectively, and supplies those square errors as branch-metric values to a path-metric calculation circuit 22.

Figure 2:
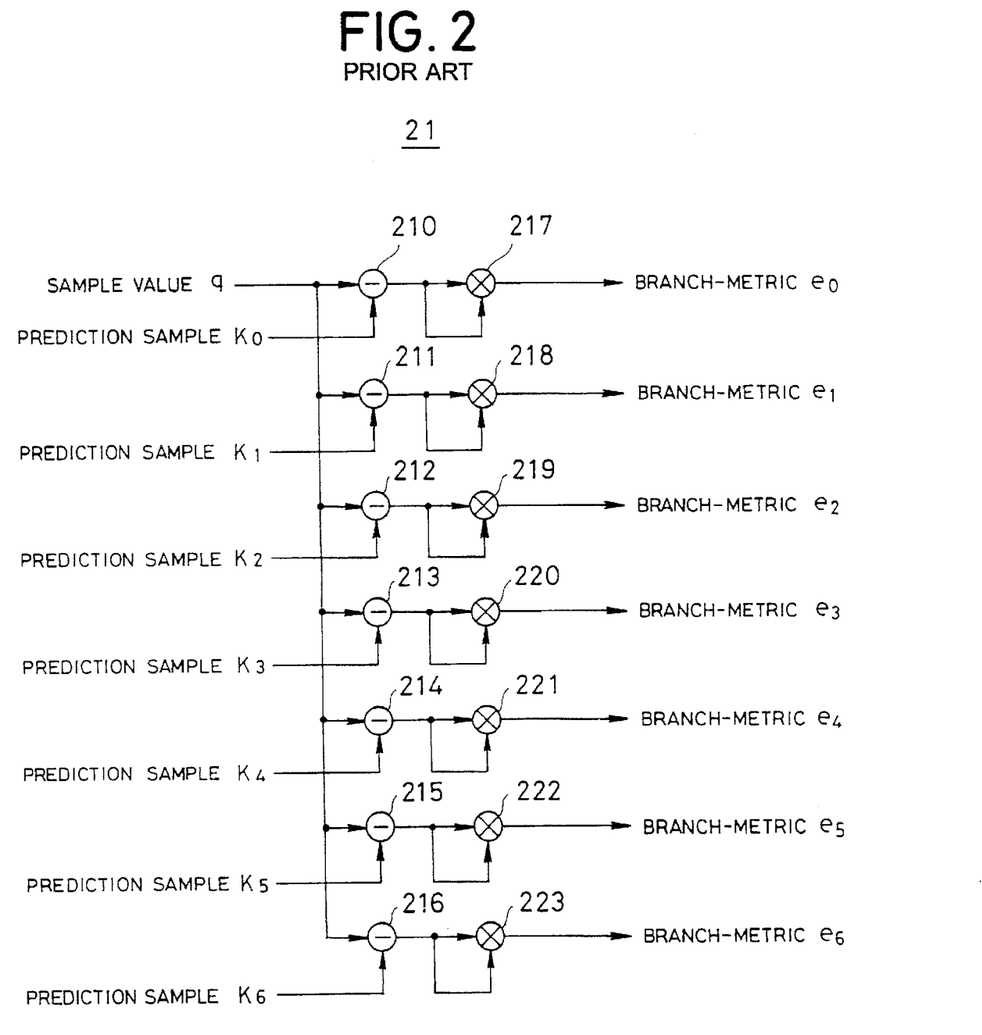
FIG. 2 is a diagram showing an internal construction of a branch-metric calculation circuit 21.

FIG. 2 is a diagram showing an example of an internal construction of the branch-metric calculation circuit 21 for arithmetically calculating the branch-metric values by using the prediction samples $K_0$ to $K_6$.

In FIG. 2, the prediction samples $K_0$ to $K_6$ are fixedly supplied to subtracters 210 to 216, respectively. The subtracter 210 and a multiplier 217 calculate a square error between the sample value q supplied from the A/D converter 10 and the prediction sample $K_0$ and supply the resulted square error as a branch-metric value $e_0$ to the path-metric calculation circuit 22. The subtracter 211 and a multiplier 218 obtain a square error between the sample value q and the prediction sample $K_1$ and supply it as a branch-metric value $e_1$ to the path-metric calculation circuit 22. The subtracter 212 and a multiplier 219 obtain a square error between the sample value q and the prediction sample $K_2$ and supply it as a branch-metric value $e_2$ to the path-metric calculation circuit 22. The subtracter 213 and a multiplier 220 obtain a square error between the sample value q and the prediction sample $K_3$ and supply it as a branch-metric value $e_3$ to the path-metric calculation circuit 22. The subtracter 214 and a multiplier 221 obtain a square error between the sample value q and the prediction sample $K_4$ and supply it as a branch-metric value $e_4$ to the path-metric calculation circuit 22. The subtracter 215 and a multiplier 222 obtain a square error between the sample value q and the prediction sample $K_5$ and supply it as a branch-metric value $e_5$ to the path-metric calculation circuit 22. The subtracter 216 and a multiplier 223 obtain a square error between the sample value q and the prediction sample $K_6$ and supply it as a branch-metric value $e_6$ to the path-metric calculation circuit 22.

Figure 3:
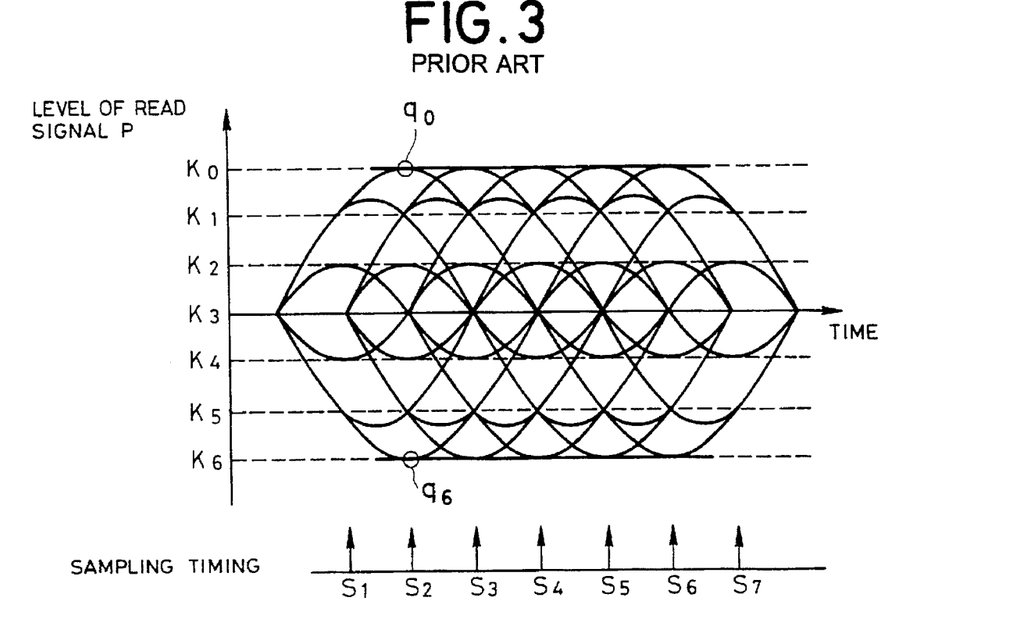
FIG. 3 is a diagram showing an example of an eye pattern of a read signal p.

FIG. 3 is a diagram showing an example of the so-called eye pattern of the read signal p which is ideally obtained in the case where the reproducing system shown in FIG. 1 is the PR (1, 2, 2, 1) transmitting system and the recording signal recorded on the optical disk 3 is the RLL (1, 7) modulated signal.

The value of the sample value q which is obtained on the basis of the read signal p is equal to any one of the prediction samples $K_0$ to $K_6$. Any one of the branch-metric values $e_0$ to $e_6$ is, therefore, equal to 0. For example, when a sample value $q_0$ is obtained at a sampling timing S2 shown in FIG. 3, the sample value $q_0$ is equal to the prediction sample $K_0$. In this instance, among the branch-metric values $e_0$ to $e_6$, the branch-metric value $e_0$ is equal to 0. In the case where a sample value $q_6$ is obtained at the sampling timing $S_2$ shown in FIG. 3, the sample value $q_6$ is equal to the prediction sample $K_6$. In this instance, among the branch-metric values $e_0$ to $e_6$, the branch-metric value $e_6$ is equal to 0.

The path-metric calculation circuit 22 individually obtains an accumulated addition value of each of the branch-metric values $e_0$ to $e_6$ every path and supplies a path selection signal indicative of a path in which the accumulated addition value is minimum to a path memory 23. While updating a serial digital signal sequence consisting of binary values of "0" and "1" in accordance with the path selection signal, the path memory 23 sequentially generates the updated digital signal sequence as a reproduction digital signal corresponding to the recording signal.

As mentioned above, the Viterbi decoder 20 obtains the square error values between the sample value q that is supplied from the A/D converter 10 and the prediction samples $K_0$ to $K_6$, respectively, and generates the data sequence corresponding to the path in which the accumulated addition value of the square error values is minimum as a reproduction digital signal corresponding to the recording signal.

When an asymmetry occurs in the read signal p and its signal waveform becomes asymmetrical with respect to the center level, however, the sample value q is not equal to any one of the prediction samples $K_0$ to $K_6$, so that such a problem occurs that a decoding performance of the Viterbi decoder deteriorates.

Figure 4:
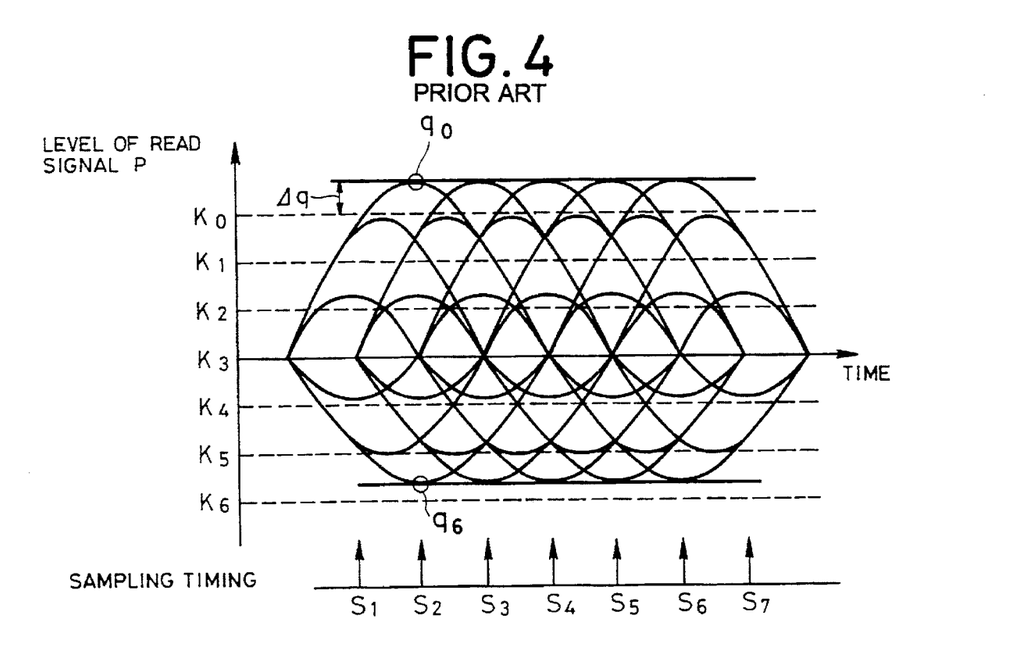
FIG. 4 is a diagram showing an example of an eye pattern of the read signal p in which an asymmetry occurs.

FIG. 4 is a diagram showing an example of the eye pattern in case an asymmetry occurs in the read signal p.

In FIG. 4, when the sample value obtained at the sampling timing $S_2$ is equal to $q_0$, the sample value $q_0$ is not equal to any one of the prediction samples $K_0$ to $K_6$. In this instance, an error $\Delta q$ occurs even for the prediction sample $K_0$ existing at the nearest position. Since the error $\Delta q$ occurs, each of the branch-metric values $e_0$ to $e_6$ increases. In the Viterbi decoding for obtaining a most certain data signal sequence on the basis of the accumulated addition value of the branch-metric value, consequently, its decoding performance deteriorates.

SUMMARY AND OBJECTS OF THE INVENTION

The present invention has been conceived in order to solve the above-mentioned problem and therefore it is an object of the invention to provide a digital signal reproducing apparatus which can correctly reproduce a digital signal by suppressing a deterioration in decoding performance of a Viterbi decoding even when an asymmetry occurs in a read signal.

According to the present invention, there is provided a digital signal reproducing apparatus for reproducing a recorded digital signal from a read signal read out from a recording medium on which the digital signal has been recorded, thereby obtaining a reproduction digital signal, comprising: amplitude limit sampling means for obtaining an amplitude limit sample value whose amplitude is limited by a predetermined amplitude limit value from the read signal; and a Viterbi decoder for performing a Viterbi decoding to the amplitude limit sample value on the basis of a plurality of prediction samples including a prediction sample whose value may be equal to the predetermined amplitude limit value, thereby obtaining the reproduction digital signal.

In the digital signal reproducing apparatus according to the present invention, an amplitude of the sample value obtained by sampling the read signal is limited up to the predetermined amplitude limit value, thereby obtaining an amplitude limit sample value, and the amplitude limit sample value is Viterbi decoded on the basis of a plurality of prediction samples including a prediction sample whose value may be equal to the predetermined amplitude limit value.

DETAILED DESCRIPTION OF THE PREFERRED EMBODIMENTS

Embodiments of the present invention will now be described hereinbelow.

Figure 5:
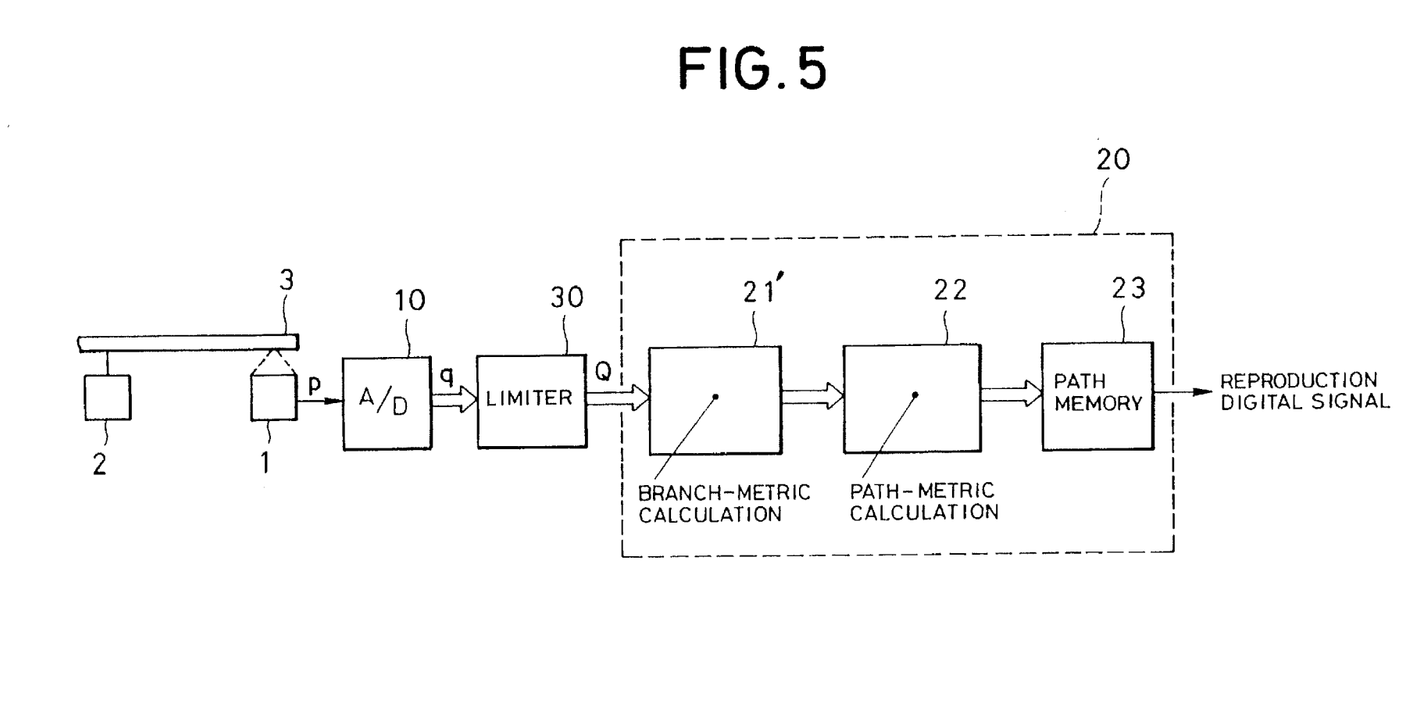
FIG. 5 is a diagram showing a construction of a digital signal reproducing apparatus according to the present invention.

FIG. 5 is a diagram showing an example of a construction of a digital signal reproducing apparatus according to the invention.

In FIG. 5, the optical pickup 1 irradiates a light beam onto the optical disk 3 which is rotated by the spindle motor 2. A digital information signal consisting of binary values each being "0" or "1" has been recorded on the optical disk 3. The optical pickup 1 photoelectrically converts a light beam reflected from the optical disk 3 into a read signal p and supplies it to the A/D converter 10. The A/D converter 10 samples the read signal p at a predetermined sampling timing, thereby obtaining the sample value q.

Explanation will now be made with respect to the sample value q in case a reproducing system shown in FIG. 5 is a partial response system of PR (1, 2, 2, 1) and the original digital signal recorded on the optical disk 3 is the RLL (1, 7) modulated signal.

In the reproducing system of PR (1, 2, 2, 1), a value which can be obtained as a sample value q is decided every signal train of continuous four bits of the digital signal recorded on the optical disk 3. Since the original digital signal has been RLL (1, 7) modulated, its minimum inversion interval is equal to 2.

When the digital signal recorded on the optical disk 3 is considered on a unit basis of the 4-bit signal train, therefore, there are only ten kinds of patterns of the 4-bit train as follows.

[0, 0, 0, 0]
[0, 0, 0, 1]
[0, 0, 1, 1]
[0, 1, 1, 1]
[1, 1, 1, 1]
[1, 1, 1, 0]
[1, 1, 0, 0]
[1, 0, 0, 0]
[0, 1, 1, 0]
[1, 0, 0, 1]

where, when the PR (1, 2, 2, 1) transmitting system is considered by making bit "1" and bit "0" among the 4-bit train correspond to +1 and −1, respectively, the sample value q obtained each time the 4-bit signal train is read out from the optical disk 3 is as follows.

$$q[0,0,0,0]=(-1)\times1+(-1)\times2+(-1)\times2+(-1)\times1=-6$$

$$q[0,0,0,1]=(-1)\times1+(-1)\times2+(-1)\times2+(+1)\times1=-4$$

$$q[0,0,1,1]=(-1)\times1+(-1)\times2+(+1)\times2+(+1)\times1=0$$

$$q[0,1,1,1]=(-1)\times1+(+1)\times2+(+1)\times2+(+1)\times1=4$$

$$q[1,1,1,1]=(+1)\times1+(+1)\times2+(+1)\times2+(+1)\times1=6$$

$$q[1,1,1,0]=(+1)\times1+(+1)\times2+(+1)\times2+(-1)\times1=4$$

$$q[1,1,0,0]=(+1)\times1+(+1)\times2+(-1)\times2+(-1)\times1=0$$

$$q[1,0,0,0]=(+1)\times1+(-1)\times2+(-1)\times2+(-1)\times1=-4$$

$$q[0,1,1,0]=(-1)\times1+(+1)\times2+(+1)\times2+(-1)\times1=2$$

$$q[1,0,0,0]=(+1)\times1+(-1)\times2+(-1)\times2+(+1)\times1=-2$$

That is, in the case where the reproducing system shown in FIG. 5 is the PR (1, 2, 2, 1) transmitting system and the original digital signal recorded on the optical disk 3 has been RLL (1, 7) modulated, a value which is predicted as a sample value q is equal to any one of 6, 4, 2, 0, −2, −4, and −6.

When the sample value q is larger than a predetermined upper limit value $L_{MAX}$, a limiter 30 supplies the upper limit value $L_{MAX}$ as an amplitude limit sample value Q to the Viterbi decoder 20. When the sample value q is smaller than the upper limit value $L_{MAX}$ and is larger than a predetermined lower limit value $L_{MIN}$, the limiter 30 supplies the supplied sample value q as it is as an amplitude limit sample value Q to the Viterbi decoder 20. In case the sample value q is smaller than the lower limit value $L_{MIN}$, the limiter 30 supplies the lower limit value $L_{MIN}$ as an amplitude limit sample value Q to the Viterbi decoder 20. Namely, the limiter 30 supplies the value obtained by limiting the amplitude of the sample value q corresponding to the read signal p by the above-mentioned upper limit value $L_{MAX}$ and lower limit value $L_{MIN}$ as an amplitude limit sample value Q to the Viterbi decoder 20.

In this instance, the upper limit value $L_{MAX}$ is set to a value which is smaller than the maximum value of the sample value q to be obtained when the level of the read signal p is fluctuated due to an influence by an asymmetry or the like and which is smaller than the maximum value of the prediction sample. The lower limit value $L_{MIN}$ is, further, set to a value which is larger than the minimum value of the sample value q to be obtained when the level of the read signal p is fluctuated due to the influence by the asymmetry or the like and which is larger than the minimum value of the prediction sample.

Figure 6:
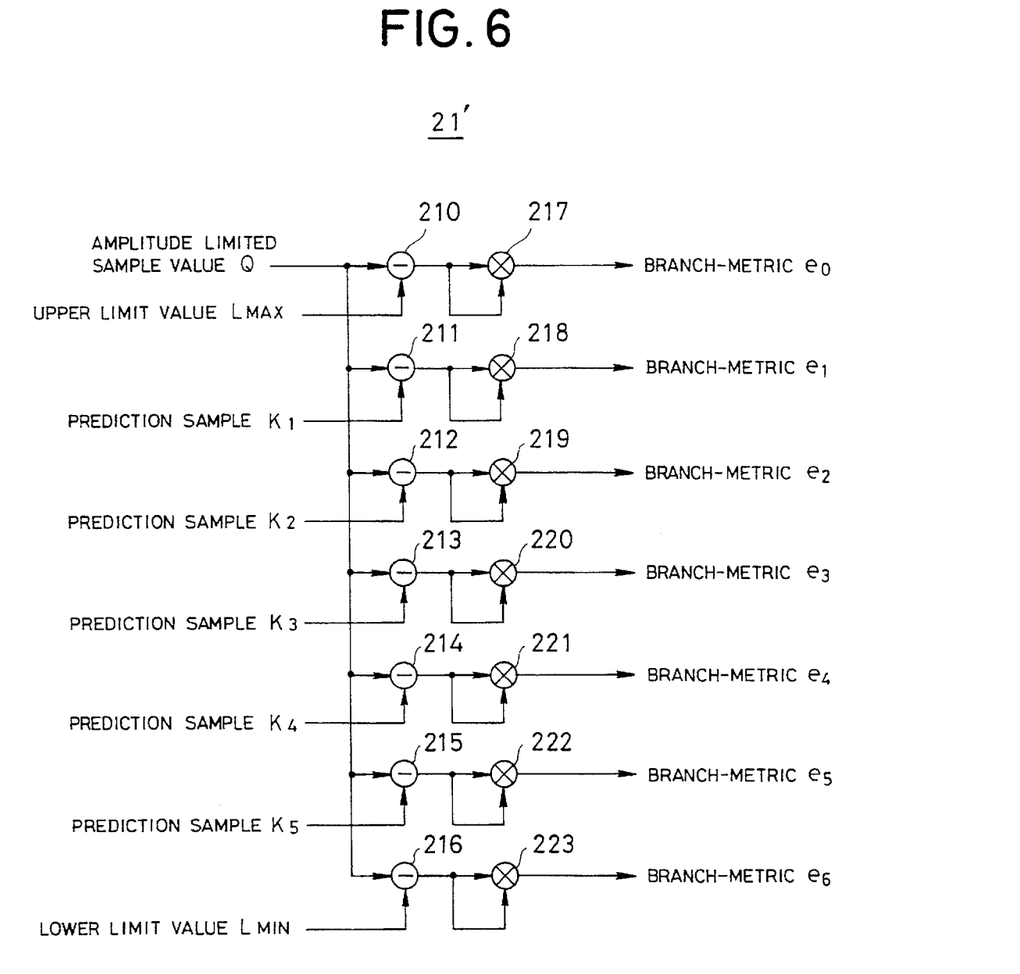
FIG. 6 is a diagram showing an internal construction of a branch-metric calculation circuit 21'.

FIG. 6 is a diagram showing a construction of a branch-metric calculation circuit 21' in the Viterbi decoder 20.

FIG. 6 shows an example of an internal construction of the branch-metric calculation circuit 21' which is used in the case where the reproducing system shown in FIG. 5 is considered as a PR (1, 2, 2, 1) transmitting system and the digital signal recorded on the optical disk 3 is the RLL (1, 7) modulated signal.

Values which are predicted as sample values q, namely, 6, 4, 2, 0, −2, −4, and −6 are made correspond as follows, respectively.

prediction sample $K_0=6$
prediction sample $K_1=4$
prediction sample $K_2=2$
prediction sample $K_3=0$
prediction sample $K_4=-2$
prediction sample $K_5=-4$
prediction sample $K_6=-6$ The branch-metric calculation circuit 21' shown in FIG. 6 uses the prediction samples $K_1$ to $K_5$ excluding the prediction sample $K_0$ whose value is maximum and the prediction sample $K_6$ whose value is minimum from among the prediction samples $K_0$ to $K_6$.

In FIG. 6, the subtracter 210 and multiplier 217 obtain a square error between the amplitude limit sample value Q supplied from the limiter 30 and the upper limit value $L_{MAX}$ as an amplitude limit value of the limiter 30 and set the square error to the branch-metric value $e_0$. The subtracter 211 and multiplier 218 obtain a square error between the amplitude limit sample value Q and the prediction sample $K_1$ and set it to the branch-metric value $e_1$. The subtracter 212 and multiplier 219 obtain a square error between the amplitude limit sample value Q and the prediction sample $K_2$ and set it to the branch-metric value $e_2$. The subtracter 213 and multiplier 220 obtain a square error between the amplitude limit sample value Q and the prediction sample $K_3$ and set it to the branch-metric value $e_3$. The subtracter 214 and multiplier 221 obtain a square error between the amplitude limit sample value Q and the prediction sample $K_4$ and set it to the branch-metric value $e_4$. The subtracter 215 and multiplier 222 obtain a square error between the amplitude limit sample value Q and the prediction sample $K_5$ and set it to the branch-metric value $e_5$.

The subtracter 216 and multiplier 223 obtain a square error between the amplitude limit sample value Q and the lower limit value $L_{MIN}$ as an amplitude limit value of the limiter 30 and set it to the branch-metric value $e_6$.

The path-metric calculation circuit 22 obtains an accumulated addition value of each of the branch-metric values $e_0$ to $e_6$ every path and supplies the path selection signal indicative of a path in which the accumulated addition value is minimum to the path memory 23. While updating a serial digital signal sequence consisting of binary values of "0" and "1" in accordance with the path selection signal, the path memory 23 sequentially generates the signal sequence as a reproduction digital signal corresponding to the recording signal.

As mentioned above, the digital signal reproducing apparatus performs the Viterbi decoding by using the amplitude limit sample value Q in which an amplitude of the sample value q obtained in correspondence to the read signal p is limited by the limiter 30. Among a plurality of prediction samples which are used for Viterbi decoding, further, the value of each of the maximum and minimum prediction samples is equalized to the amplitude limit value of the limiter 30.

According to the construction, even if an asymmetry occurs in the read signal p and the sample value q exceeds a range of the prediction samples $K_0$ to $K_6$, in this instance, the branch-metric value $e_0$ or $e_6$ can be forcedly set to 0.

Figure 7:
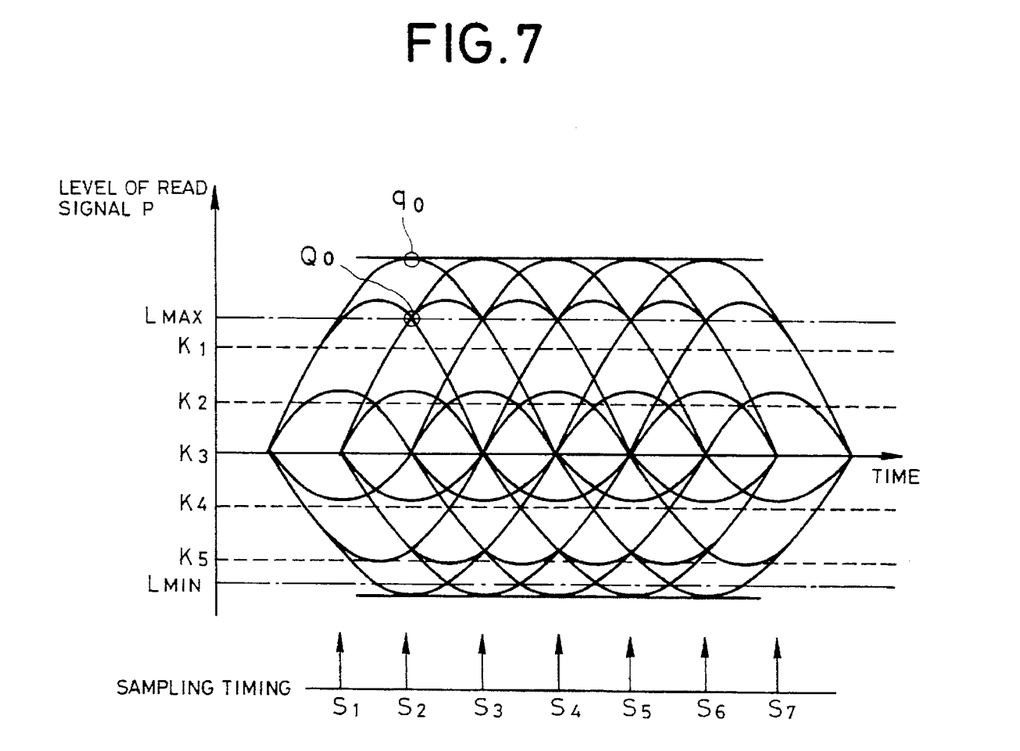
FIG. 7 is a diagram showing an example of an eye pattern of the read signal p in which an asymmetry occurs.

In FIG. 7, for instance, it is assumed that the sample value obtained at the sampling timing $S_2$ is set to $q_0$. In this instance, the sample value $q_0$ is larger than the upper limit value $L_{MAX}$ as an amplitude limit value of the limiter 30 as shown in FIG. 7. The limiter 30, therefore, sets the upper limit value $L_{MAX}$ itself to an amplitude limit sample value $Q_0$ and supplies it to the branch-metric calculation circuit 21' of the Viterbi decoder 20. The amplitude limit sample value $Q_0$ is supplied to each of the subtracters 210 to 216 of the branch-metric calculation circuit 21' shown in FIG. 6. Among the subtracters 210 to 216, the subtracter 210 performs a subtraction between the amplitude limit sample value $Q_0$ as an upper limit value $L_{MAX}$ and the upper limit value $L_{MAX}$. The subtraction result is, therefore, equal to 0 and the branch-metric value $e_0$ is also equal to 0.

According to the invention, therefore, even if the value of the obtained sample value q exceeds the range of the prediction samples $K_0$ to $K_6$ and is not equal to any one of the prediction samples $K_0$ to $K_6$ due to an influence by the asymmetry, an error which occurs by a deviation between the sample value q and each of the prediction samples $K_0$ to $K_6$ is not reflected to the branch-metric value, so that a deterioration in performance of the Viterbi decoding can be suppressed.

In the embodiment shown in FIG. 5, although the amplitude limitation using the limiter 30 has been executed to the sample value q obtained by A/D converting the read signal p. However, the amplitude limitation may be applied to the read signal p. Even in that case, a desirable reproduction can be expected.

Figure 8:
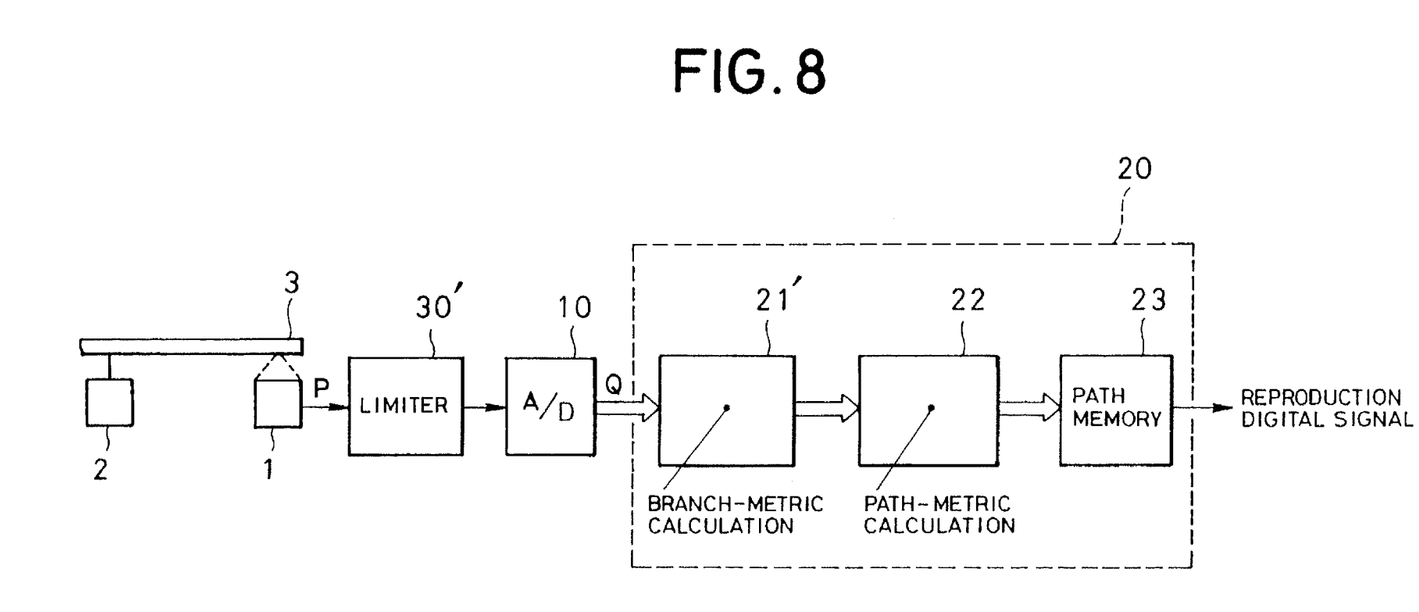
FIG. 8 is a diagram showing a construction of a digital signal reproducing apparatus which is another embodiment of the present invention.

FIG. 8 is a diagram showing a construction of a digital signal reproducing apparatus which is another embodiment of the invention made in consideration of the above points.

In FIG. 8, functional blocks having the same functions as those of the functional blocks shown in FIG. 5 are designated by the same reference numerals.

Figure 9:
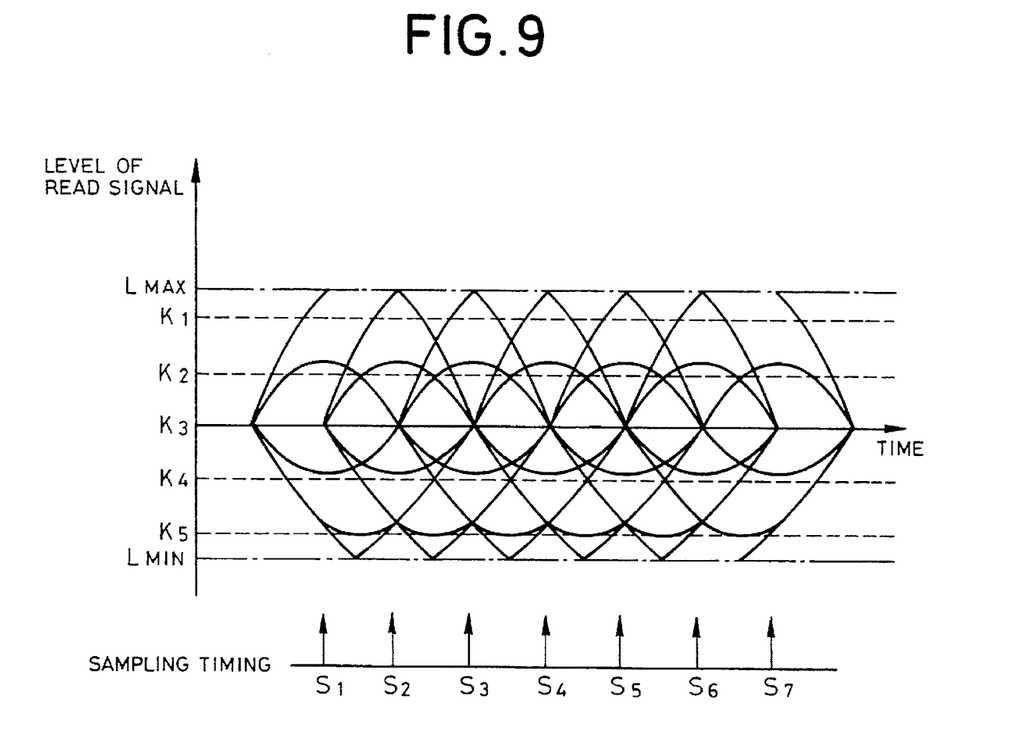
FIG. 9 is a diagram showing an example of an eye pattern of the read signal p whose amplitude is limited.

In the digital signal reproducing apparatus shown in FIG. 8, the read signal p read out from the optical disk 3 is supplied to a limiter 30'. As shown in FIG. 9, the limiter 30' limits an amplitude value of the read signal p at a signal level corresponding to the upper limit value $L_{MAX}$ and the lower limit value $L_{MIN}$ and supplies the resultant signal to the A/D converter 10. Since the A/D converter 10 A/D converts the amplitude-limited read signal, the sample value to be obtained is equal to the amplitude limit sample value Q.

In brief, so long as the limiter is constructed in such a manner that the sample value which is obtained by the A/D converter 10 is equal to the amplitude limit sample value Q whose amplitude is limited by the predetermined amplitude limit value, the limiter 30 can be provided before or after the A/D converter 10.

In the branch-metric calculation circuit 21' shown in FIG. 6, among the prediction samples $K_0$ to $K_6$, each of the prediction sample $K_0$ whose value is maximum and the prediction sample $K_6$ whose value is minimum is equalized to the amplitude limit value (the upper limit value $L_{MAX}$ and the lower limit value $L_{MIN}$) in the limiter 30. A plurality of prediction samples near the maximum and minimum values can be also equalized to the amplitude limit value.

Figure 10:
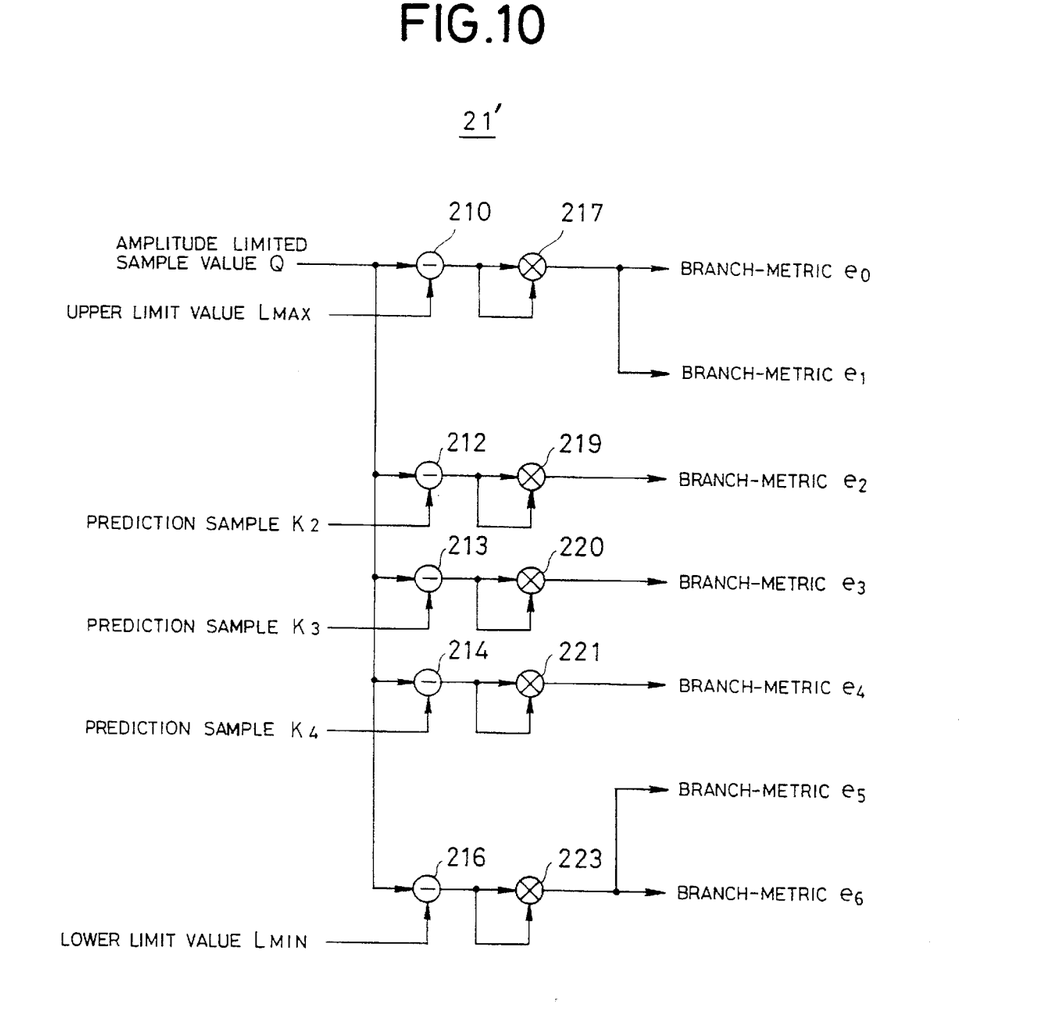
FIG. 10 is a diagram showing an internal construction of the branch-metric calculation circuit 21' which is another embodiment of the present invention.

FIG. 10 is a diagram showing an internal construction of the branch-metric calculation circuit 21' according to another embodiment of the invention made in consideration of the above points.

In FIG. 10, functional blocks having the same functions as those of the functional blocks shown in FIG. 6 are designated by the same reference numerals.

In FIG. 10, the subtracter 210 and multiplier 217 obtain a square error between the amplitude limit sample value Q supplied from the limiter 30 and the upper limit value $L_{MAX}$ as an amplitude limit value of the limiter 30 and supply the square error as branch-metric values $e_0$ and $e_1$ to the path-metric calculation circuit 22. The subtracter 212 and multiplier 219 obtain a square error between the amplitude limit sample value Q and the prediction sample $K_2$ and supply the square error as a branch-metric value $e_2$ to the path-metric calculation circuit 22. The subtracter 213 and multiplier 220 obtain a square error between the amplitude limit sample value Q and the prediction sample $K_3$ and supply it as a branch-metric value $e_3$ to the path-metric calculation circuit 22. The subtracter 214 and multiplier 221 obtain a square error between the amplitude limit sample value Q and the prediction sample $K_4$ and supply it as a branch-metric value $e_4$ to the path-metric calculation circuit 22. The subtracter 216 and multiplier 223 obtain a square error between the amplitude limit sample value Q and the lower limit value $L_{MIN}$ as an amplitude limit value of the limiter 30 and supply it as branch-metric values $e_5$ and $e_6$ to the path-metric calculation circuit 22.

Namely, the branch-metric calculation circuit 21' shown in FIG. 10 equalizes not only the prediction sample $K_0$ but also the prediction sample $K_1$ to the upper limit value $L_{MAX}$ of the limiter 30. The circuit 21' further equalizes not only the prediction sample $K_6$ but also the prediction sample $K_5$ to the lower limit value $L_{MIN}$ of the limiter 30.

In the branch-metric calculation circuit 21' shown in FIG. 10, therefore, the construction comprising the subtracter 211 and multiplier 218 and the construction comprising the subtracter 215 and multiplier 222 which are used in the branch-metric calculation circuit 21' shown in FIG. 6 are substantially unnecessary.

When the branch-metric calculation circuit 21' shown in FIG. 10 is used, therefore, the circuit scale can be reduced as compared with the branch-metric calculation circuit 21' of FIG. 6.

According to the present invention, in the Viterbi algorithm as mentioned above, by paying attention to a point that values near the maximum and minimum levels of the read signal are not important in the decoding, the amplitude limit sample value is obtained in a manner such that the amplitude of the sample value obtained by sampling the read signal is limited by the predetermined amplitude limit value and, the amplitude limit sample value is Viterbi decoded on the basis of the plurality of prediction samples including the prediction sample whose value is equal to the predetermined amplitude limit value.

According to the construction, the value of the branch-metric can be forcedly set to 0 under the situation even if the amplitude of the sample value obtained when the read signal is sampled is larger or smaller than the ideal value due to an influence by the asymmetry.

The sample value obtained by sampling the read signal, therefore, is not remarkably deviated from the prediction sample value, so that the deterioration in decoding performance of the Viterbi decoding can be prevented. By equalizing the values of two or more prediction samples to the predetermined amplitude limit value, the circuit scale can be reduced.

What is claimed is:

1. A digital signal reproducing apparatus for reproducing recorded information from a read signal read out from a recording medium on which a digital signal has been recorded, thereby obtaining a reproduction digital signal, comprising:

amplitude limit sampling means for sampling said read signal so as to produce an amplitude limit sample value whose amplitude is limited within a predetermined amplitude limit range defined by predetermined upper and lower limit values; and a Viterbi decoder for performing a Viterbi decoding to said amplitude limit sample value on the basis of a plurality of prediction samples including prediction samples whose values are respectively equal to said predetermined amplitude upper and lower limit values, thereby obtaining said reproduction digital signal.

2. An apparatus according to claim 1, wherein said upper limit value is equal to a value of a maximum prediction sample among said plurality of prediction samples, and said lower limit value is equal to a value of a minimum prediction sample among said plurality of prediction samples.

3. An apparatus according to claim 1, wherein values of at least two prediction samples among said prediction samples are equal to said predetermined amplitude limit values.

4. An apparatus according to claim 1 or 2, wherein said amplitude limit sampling means comprises:

an A/D converter for sampling said read signal at every predetermined sampling timing, thereby obtaining a sample value; and a limiter for setting said upper limit value to said amplitude limit sample value in case said sample value is larger than said upper limit value, setting said sample value as it is to said amplitude limit sample value in case said sample value is smaller than said upper limit value and is larger than said lower limit value, and setting said lower limit value to said amplitude limit sample value in case said sample value is smaller than said lower limit value.

5. An apparatus according to claim 1 or 2, wherein said amplitude limit sampling means comprises:

a limiter for limiting an amplitude of said read signal within a range defined by said upper limit value and said lower limit value; and an A/D converter for sampling said read signal whose amplitude is limited by said limiter at every predetermined sampling timing, thereby producing said amplitude-limited sample value.

\* \* \* \* \*